US012587234B2

(12) United States Patent
Stahl et al.

(10) Patent No.: US 12,587,234 B2
(45) Date of Patent: Mar. 24, 2026

(54) ONLINE LEARNING OF TRANSMISSION PHASE CONTROL FOR A COMMUNICATIONS DEVICE THAT COMMUNICATES VIA INDUCTIVE COUPLING

(71) Applicant: NXP B.V., Eindhoven (NL)

(72) Inventors: Johannes Stahl, Graz (AT); Ulrich Andreas Muehlmann, Graz (AT)

(73) Assignee: NXP B.V., Eindhoven (NL)

( * ) Notice: Subject to any disclaimer, the term of this patent is extended or adjusted under 35 U.S.C. 154(b) by 811 days.

(21) Appl. No.: 17/971,515

(22) Filed: Oct. 21, 2022

(65) Prior Publication Data

US 2024/0137070 A1 Apr. 25, 2024
US 2024/0235614 A9 Jul. 11, 2024

(51) Int. Cl.
*H04B 5/70* (2024.01)
*H04B 5/24* (2024.01)

(52) U.S. Cl.
CPC ................. *H04B 5/70* (2024.01); *H04B 5/24* (2024.01)

(58) Field of Classification Search
CPC .................................... H04B 5/70; H04B 5/24
USPC ...................................................... 455/41.1
See application file for complete search history.

(56) References Cited

U.S. PATENT DOCUMENTS 9,646,299 B1 5/2017 Rezayee et al.
9,935,689 B2 4/2018 Hueber et al.

2009/0099862 A1* 4/2009 Fireman ................. G16H 20/00
705/2
2016/0174267 A1* 6/2016 Mofidi .................. H04W 28/18
455/41.1
2017/0163357 A1* 6/2017 Cordier .................. H04B 17/21
(Continued)

FOREIGN PATENT DOCUMENTS

WO 2021031856 A1 2/2021

OTHER PUBLICATIONS

EMV, "EMV Contactless Communication Protocol Specification", Contactless Specifications for Payment Systems, Book D, Version 2.6, Mar. 2016, 249 pgs.
(Continued)

*Primary Examiner* — Eugene Yun

(57) ABSTRACT

Methods for operating a communications device that communicates via inductive coupling, methods for operating an NFC device, and a communications device that communicates via inductive coupling are disclosed. In an embodiment, a method involves at the communications device, shifting a first transmission phase to obtain an updated transmission phase in response to information from a corresponding reader device, which indicates that active load modulation (ALM) communications between the communications device and the corresponding reader device under the first transmission phase fail, at the communications device, conducting subsequent ALM communications with the corresponding reader device under the updated transmission phase, in response to that the subsequent ALM communications under the updated transmission phase are successfully conducted between the communications device and the corresponding reader device, obtaining a new training data point based on the updated transmission phase, and training the communications device in response to the new training data point.

9 Claims, 7 Drawing Sheets

702
AT THE NFC DEVICE, SHIFT A FIRST TRANSMISSION PHASE TO OBTAIN AN UPDATED TRANSMISSION PHASE IN RESPONSE TO INFORMATION FROM A CORRESPONDING NFC READER DEVICE, WHICH INDICATES THAT ACTIVE LOAD MODULATION (ALM) COMMUNICATIONS BETWEEN THE NFC DEVICE AND THE CORRESPONDING NFC READER DEVICE USING THE FIRST TRANSMISSION HAVE FAILED

704
AT THE NFC DEVICE, CONDUCT SUBSEQUENT ALM COMMUNICATIONS WITH THE CORRESPONDING NFC READER DEVICE USING THE UPDATED TRANSMISSION PHASE

706
IN RESPONSE TO THE SUBSEQUENT ALM COMMUNICATIONS BEING SUCCESSFULLY CONDUCTED BETWEEN THE NFC DEVICE AND THE CORRESPONDING NFC READER DEVICE USING THE UPDATED TRANSMISSION PHASE, OBTAIN A NEW TRAINING DATA POINT BASED ON THE UPDATED TRANSMISSION PHASE

708
TRAIN AN ARTIFICIAL NEURAL NETWORK (ANN) OF THE NFC DEVICE IN RESPONSE TO THE NEW TRAINING DATA POINT

(56) References Cited

U.S. PATENT DOCUMENTS

| | | |
|---|---|---|
| 2018/0034621 A1 | 2/2018 | Hueber et al. |
| 2022/0166463 A1 | 5/2022 | Stahl et al. |
| 2022/0231897 A1 | 7/2022 | Stahl et al. |
| 2022/0272083 A1* | 8/2022 | Rule ..................... H04L 9/3242 |
| 2025/0190207 A1* | 6/2025 | Xiong ...................... G06F 8/65 |

OTHER PUBLICATIONS

Nederlandse Norm, "NEN-ISO/IEC 15693-1 (en) Cards and security devices for personal identification—Contactless vicinity objects, Part 1: Physical characteristics (ISO/IEC 15693-1:2018,IDT)", (Jul. 2018), 16 pgs.

ISO/IEC, "Cards and security devices for personal identification—Contactless vicinity objects—Part 2: Air interface and Initialization", (2019), 28 pgs.

Nederlandse Norm, "NEN-ISO/IEC 15693-3 (en) Cards and security devices for personal identification—Contactless vicinity objects—Part 3: Anticollision and transmission protocol (ISO/IEC 15693-3:2019, IDT)", (2019), 28 pgs.

ISO/IEC, "Cards and security devices for personal identification—Contactless proximity objects—Part 1: Physical characteristics", ISO/IEC 14443-1, Fourth edition Apr. 2018, (2018), 18 pgs.

ISO/IEC, "Cards and security devices for personal identification—Contactless proximity objects—Part 2: Radio frequency power and signal interface", ISO/IEC 14443-2, Fourth edition Jul. 2020, (2020), 54pgs.

ISO/IEC, "Cards and security devices for personal identification—Contactless proximity objects—Part 3: Initialization and anticollision", ISO/IEC 14443-3, Fourth edition Jul. 2018, (2018), 64pgs.

ISO/IEC, "Cards and security devices for personal identification—Contactless proximity objects—Part 4: Transmission protocol", ISO/IEC 14443-4, Fourth edition Jul. 2018, (2018), 62 pgs.

NFC Forum, "Analog Technical Specification", Version 2.2, Jul. 29, 2021, 104 pgs.

NFC Forum, "Digital Protocol Technical Specification", Version 2.3, Aug. 3, 2021, 269 pgs.

* cited by examiner

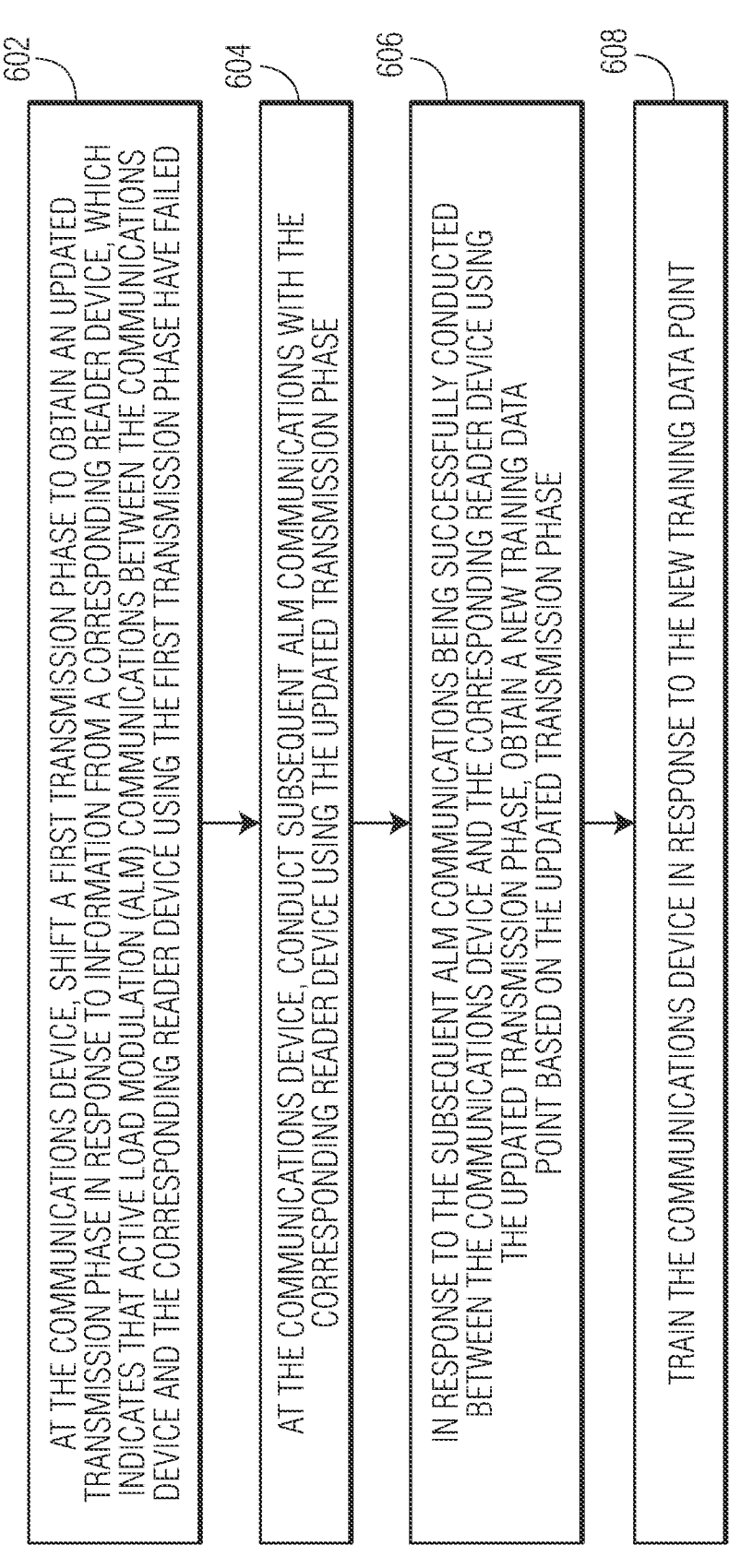

602 AT THE COMMUNICATIONS DEVICE, SHIFT A FIRST TRANSMISSION PHASE TO OBTAIN AN UPDATED TRANSMISSION PHASE IN RESPONSE TO INFORMATION FROM A CORRESPONDING READER DEVICE, WHICH INDICATES THAT ACTIVE LOAD MODULATION (ALM) COMMUNICATIONS BETWEEN THE COMMUNICATIONS DEVICE AND THE CORRESPONDING READER DEVICE USING THE FIRST TRANSMISSION PHASE HAVE FAILED

604 AT THE COMMUNICATIONS DEVICE, CONDUCT SUBSEQUENT ALM COMMUNICATIONS WITH THE CORRESPONDING READER DEVICE USING THE UPDATED TRANSMISSION PHASE

606 IN RESPONSE TO THE SUBSEQUENT ALM COMMUNICATIONS BEING SUCCESSFULLY CONDUCTED BETWEEN THE COMMUNICATIONS DEVICE AND THE CORRESPONDING READER DEVICE USING THE UPDATED TRANSMISSION PHASE, OBTAIN A NEW TRAINING DATA POINT BASED ON THE UPDATED TRANSMISSION PHASE

608 TRAIN THE COMMUNICATIONS DEVICE IN RESPONSE TO THE NEW TRAINING DATA POINT

FIG. 6

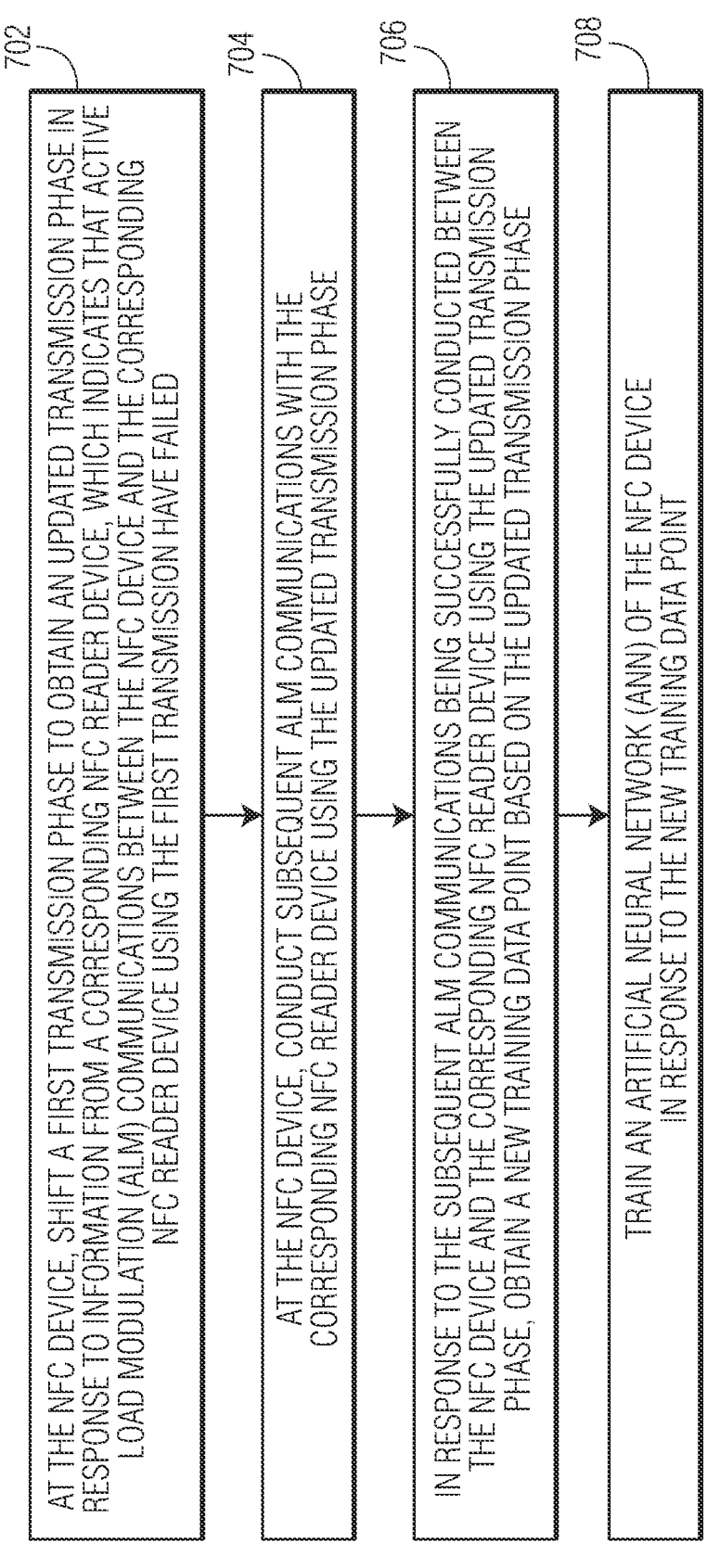

702

AT THE NFC DEVICE, SHIFT A FIRST TRANSMISSION PHASE TO OBTAIN AN UPDATED TRANSMISSION PHASE IN RESPONSE TO INFORMATION FROM A CORRESPONDING NFC READER DEVICE, WHICH INDICATES THAT ACTIVE LOAD MODULATION (ALM) COMMUNICATIONS BETWEEN THE NFC DEVICE AND THE CORRESPONDING NFC READER DEVICE USING THE FIRST TRANSMISSION HAVE FAILED

704

AT THE NFC DEVICE, CONDUCT SUBSEQUENT ALM COMMUNICATIONS WITH THE CORRESPONDING NFC READER DEVICE USING THE UPDATED TRANSMISSION PHASE

706

IN RESPONSE TO THE SUBSEQUENT ALM COMMUNICATIONS BEING SUCCESSFULLY CONDUCTED BETWEEN THE NFC DEVICE AND THE CORRESPONDING NFC READER DEVICE USING THE UPDATED TRANSMISSION PHASE, OBTAIN A NEW TRAINING DATA POINT BASED ON THE UPDATED TRANSMISSION PHASE

708

TRAIN AN ARTIFICIAL NEURAL NETWORK (ANN) OF THE NFC DEVICE IN RESPONSE TO THE NEW TRAINING DATA POINT

FIG. 7

ONLINE LEARNING OF TRANSMISSION PHASE CONTROL FOR A COMMUNICATIONS DEVICE THAT COMMUNICATES VIA INDUCTIVE COUPLING

BACKGROUND

Wireless devices (e.g., radio frequency identification (RFID) transponders) that utilize near field communications (NFC) can be configured for active load modulation (ALM). For example, components for implementing ALM in a transponder (e.g., a mobile device) can be more compact. In addition, because an ALM transponder can generate a magnetic field (e.g., utilizing a power source) rather than just modulate a magnetic field created by a reader device, ALM transponders can have wide communications range. When an NFC-enabled device implements ALM, the transmission (TX) phase of the NFC-enabled device typically needs to be aligned with a reader device's carrier phase to ensure successful communications between the NFC-enabled device and the reader device. Mechanisms to control the TX phase of an NFC-enabled device towards an optimal value typically rely on prior knowledge about the communications performance for a certain TX phase configuration in a specific communications scenario and, normally, succeed only in communications scenarios that are similar to training scenarios. However, new communications scenarios generally cannot be handled adequately by prior-knowledge-based phase control mechanisms. Therefore, this is a need for a phase control mechanism that cures the weakness of fixed parameterization of phase control mechanisms and hence enables an NFC-enabled device to tune itself to new, previously unseen communications scenarios.

SUMMARY

Embodiments of methods for operating a communications device that communicates via inductive coupling, methods for operating an NFC device, and a communications device that communicates via inductive coupling are disclosed. In an embodiment, a method for operating a communications device that communicates via inductive coupling involves at the communications device, shifting a first transmission phase to obtain an updated transmission phase in response to information from a corresponding reader device, which indicates that ALM communications between the communications device and the corresponding reader device using the first transmission phase have failed, at the communications device, conducting subsequent ALM communications with the corresponding reader device using the updated transmission phase, in response to the subsequent ALM communications being successfully conducted between the communications device and the corresponding reader device using the updated transmission phase, obtaining a new training data point based on the updated transmission phase, and training the communications device in response to the new training data point.

In an embodiment, at the communications device, shifting the first transmission phase to obtain the updated transmission phase in response to the information from the corresponding reader device includes at the communications device, shifting the first transmission phase by 90° to obtain the updated transmission phase in response to the information from the corresponding reader device.

In an embodiment, training the communications device in response to the new training data point includes training an artificial neural network (ANN) of the communications device in response to the new training data point.

In an embodiment, the method further includes at the communications device, extracting an input vector for the ANN from a message received from the corresponding reader device.

In an embodiment, the new training data point includes a combination of the input vector and the updated transmission phase.

In an embodiment, the method further includes updating a weight of the ANN based on the combination of the input vector and the updated transmission phase.

In an embodiment, training the communications device in response to the new training data point includes training the ANN based on the updated weight of the ANN.

In an embodiment, the method further includes at the communications device, extracting an input vector from a first command from the corresponding reader device.

In an embodiment, the method further includes at the communications device, determining the first transmission phase based on the input vector.

In an embodiment, the method further includes from the communications device, transmitting a first response to the first command to the corresponding reader device using the first transmission phase.

In an embodiment, a method for operating a near field communications (NFC) device involves at the NFC device, shifting a first transmission phase to obtain an updated transmission phase in response to information from a corresponding NFC reader device, which indicates that active load modulation (ALM) communications between the NFC device and the corresponding NFC reader device using the first transmission phase have failed, at the NFC device, conducting subsequent ALM communications with the corresponding NFC reader device using the updated transmission phase, in response to the subsequent ALM communications being successfully conducted between the NFC device and the corresponding NFC reader device using the updated transmission phase, obtaining a new training data point based on the updated transmission phase, and training an ANN of the NFC device in response to the new training data point.

In an embodiment, at the NFC device, shifting the first transmission phase to obtain the updated transmission phase in response to the information from the corresponding NFC reader device includes at the NFC device, shifting the first transmission phase by 90° to obtain the updated transmission phase in response to the information from the corresponding NFC reader device.

In an embodiment, the method further includes at the NFC device, extracting an input vector for the ANN from a message received from the corresponding NFC reader device.

In an embodiment, the new training data point includes a combination of the input vector and the updated transmission phase.

In an embodiment, the method further includes updating a weight of the ANN of the NFC based on the combination of the input vector and the updated transmission phase.

In an embodiment, training the ANN of the NFC device in response to the new training data point includes training the ANN of the NFC device based on the updated weight of the ANN of the NFC.

In an embodiment, the method further includes at the NFC device, extracting an input vector from a first command from the corresponding NFC reader device.

In an embodiment, the method further includes at the NFC device, determining the first transmission phase based on the input vector.

In an embodiment, the method further includes from the NFC device, transmitting a first response to the first command to the corresponding NFC reader device using the first transmission phase.

In an embodiment, a communications device that communicates via inductive coupling, the communications device includes a controller configured to shift a first transmission phase to obtain an updated transmission phase in response to information from a corresponding reader device, which indicates that ALM communications between the communications device and the corresponding reader device using the first transmission phase have failed, a radio frequency (RF) unit configured to conduct subsequent ALM communications with the corresponding reader device using the updated transmission phase, where in response to the subsequent ALM communications being successfully conducted between the communications device and the corresponding reader device using the updated transmission phase, the controller is further configured to obtain a new training data point based on the updated transmission phase, and a phase optimization module (POM) configure to train an ANN in response to the new training data point.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 6 is a process flow diagram of a method for operating a communications device that communicates via inductive coupling in accordance with an embodiment of the invention.

FIG. 7 is a process flow diagram of a method for operating an NFC device in accordance with an embodiment of the invention.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
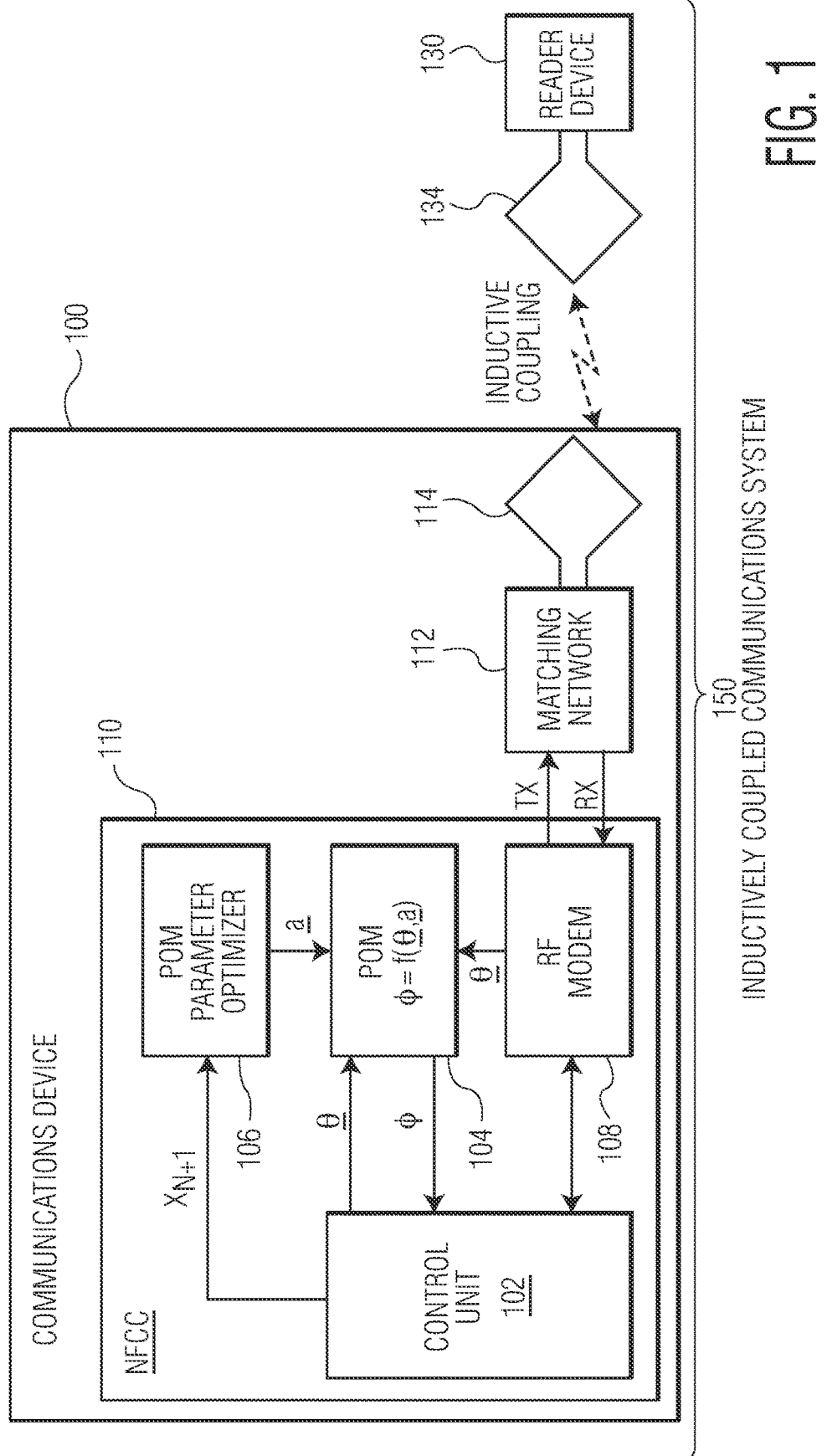
FIG. 1 depicts an embodiment of a communications device that can be used with a corresponding reader device to form an inductively coupled communications system.

FIG. 1 depicts an embodiment of a communications device 100 that can be used with a corresponding reader device 130 to form an inductively coupled communications system 150. In the inductively coupled communications system 150 depicted in FIG. 1, the communications device 100 communicates with the corresponding reader device 130 via inductive coupling. The corresponding reader device 130 may be a dedicated reader device or a communications device in reader-mode. In the embodiment depicted in FIG. 1, the communications device 100 includes a control unit 102, a phase optimization module (POM) 104, a POM parameter optimizer 106, an RF modem 108, and a matching network 112 that is coupled to an antenna 114. The antenna 114 may be an induction type antenna such as a loop antenna. In an example operation of the communications device 100, an RF signal is received by the antenna 114 via inductive coupling from an antenna 134 of the corresponding reader device 130 and is passed to the RF modem 108 to convert the RF signal into a digital signal. In response to the RF signal, an outgoing RF signal is produced and transmitted to the antenna 134 of the corresponding reader device 130 via inductive coupling using the antenna 114. In some embodiments, the communications device is implemented in a handheld computing system or a mobile computing system, such as a mobile phone. Although the illustrated communications device 100 is shown with certain components and described with certain functionality herein, other embodiments of the communications device may include fewer or more components to implement the same, less, or more functionality. For example, the communications device 100 may include a clock generation circuit configured to generate a clock signal that is synchronous to a received clock signal from the corresponding reader device 130 and thus synchronous to the carrier sent out by the corresponding reader device 130.

In the embodiment depicted in FIG. 1, the communications device 100 is a near field communications (NFC) device that utilizes inductive coupling to communicate. The communications device 100 can be implemented in at least one substrate, such as at least one semiconductor wafer. In an embodiment, the communications device 100 or a component of the communications device 100 is packaged as a stand-alone integrated circuit (IC) chip. For example, the control unit 102, the POM 104, the POM parameter optimizer 106, and the RF modem 108 may form an NFC circuit (NFCC) 110 and are located on the same IC chip. In some embodiments, the control unit 102, the POM 104, the POM parameter optimizer 106, and the RF modem 108 are located in close proximity but in different IC chips. In some embodiments, the communications device 100 is implemented as an RF transponder compatible with the International Organization for Standardization (ISO)/the International Electrotechnical Commission (IEC) 14443 standard. In the embodiment depicted in FIG. 1, the communications device 100 is an active load modulation (ALM) device. In some embodiments, the antenna 114 can be configured to generate its own magnetic field for transmitting an outgoing RF signal using a current source, which can result in greater communications distances than passive load modulation (PLM) devices. The corresponding reader device 130 is capable of demodulating the signal because the amplitude of the RF signal captured from the communications device has sufficient signal-to-noise ratio (SNR) and dynamic range.

In the embodiment depicted in FIG. 1, the communications device 100 can learn (e.g., by machine learning) from failing communications cycles and adapt itself to new, previously unseen communications scenarios, for example, by performing online learning of phase control parameters. The communications device 100 can align its transmission (TX) phase with the carrier phase of the corresponding reader device 130 to ensure successful communications between the NFC-enabled communications device 100 and the corresponding reader device 130. Mechanisms to control the TX phase towards an optimal value typically rely on prior knowledge about the communications performance for a certain TX phase configuration in a specific communications scenario and, normally, succeed only in communications scenarios that are similar to training scenarios. For example, phase control parameters typically need to be learned offline by collecting training data and subsequently optimizing the phase control parameters with regard to the collected training data. In the embodiment depicted in FIG. 1, the communications device 100 can perform TX phase optimization entirely by online learning or update initial parameters based on new observations (i.e., offline training with phase control parameter update by online learning). In online learning, initial configuration might not be optimal. However, phase control parameters can adapt to new, previously unknown communications scenarios and no training data collection campaign is necessary. In offline training with phase control parameter update by online learning, optimal phase control parameters are available from first system start, and phase control parameters can adapt to new, previously unknown communications scenarios. Compared to mechanisms that rely on prior knowledge about the communications performance for a certain TX phase configuration in a specific communications scenario to control the TX phase towards an optimal value, the communications device 100 can align its transmission (TX) phase with the carrier phase of the corresponding reader device 130 in communications scenarios that are similar to training scenarios as well as in new communications scenarios that are different from training scenarios.

Figure 2:
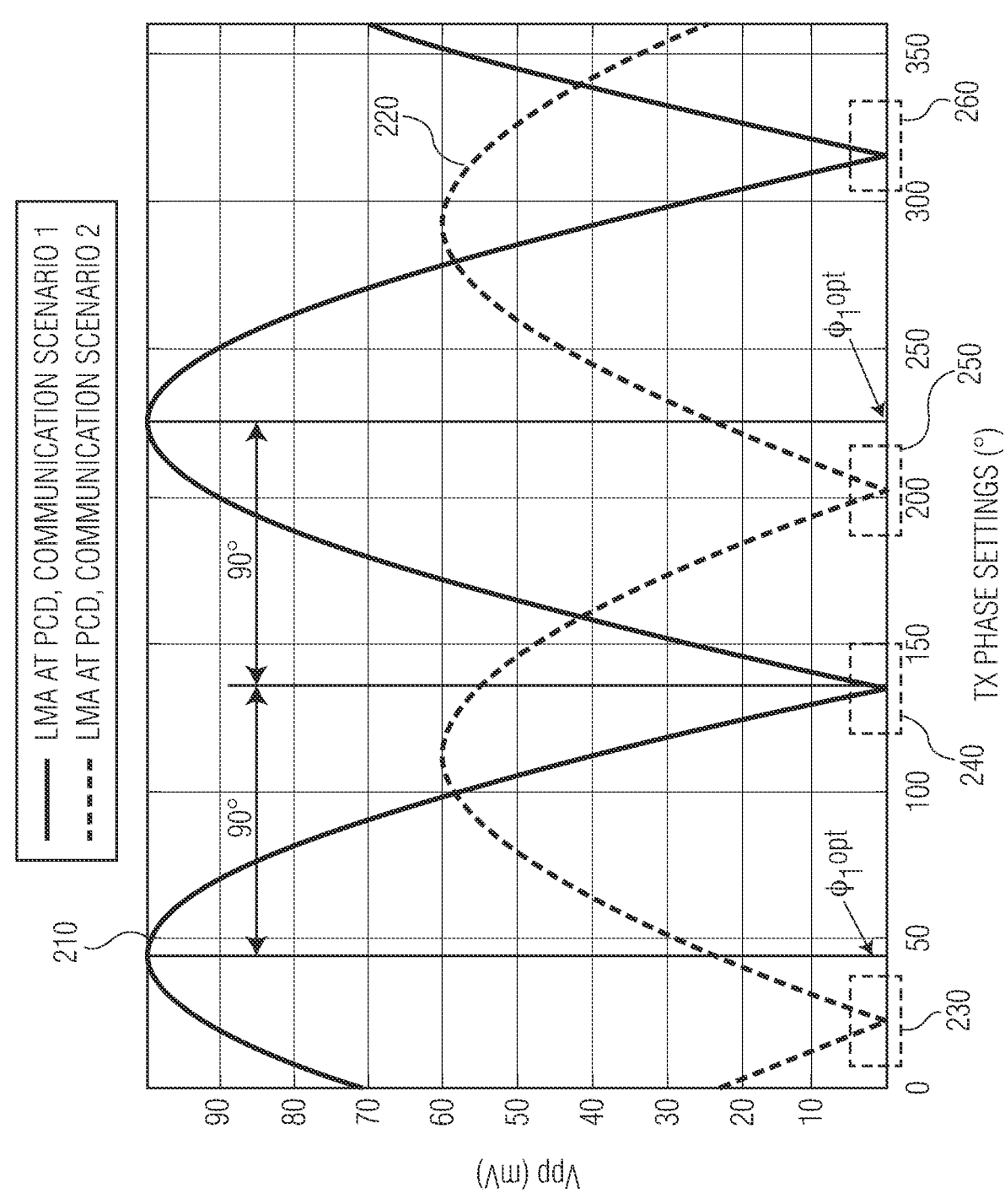
FIG. 2 depicts an illustration of load modulation amplitude (LMA) on the proximity coupling device (PCD) side as a function of TX phase on the card-emulating device (CED) side in two different communications scenarios.

FIG. 2 depicts an illustration of load modulation amplitude (LMA) (in mV) on the proximity coupling device (PCD) side (i.e., on the side of the corresponding reader device 130 depicted in FIG. 1) as a function of TX phase setting $\phi$ (in degrees) on the card-emulating device (CED) side (i.e., on the side of the communications device 100 depicted in FIG. 1) in two different communications scenarios. More specifically, FIG. 2 shows the relation between LMA and $\phi$ when the corresponding reader device 130 receives a signal transmitted from the communications device 100, which is a card emulating device that utilizes active load modulation (ALM), and the TX phase setting #. In the embodiment depicted in FIG. 2, two different scenarios correspond to different physical arrangements of the card-emulating device (CED) (i.e., the communications device 100) and the proximity coupling device (PCD) (i.e., the corresponding reader device 130). Specifically, the curve 210 corresponds to a first scenario (e.g., an arrangement where the CED (i.e., the communications device 100) is placed in 2 millimeters (mm) distance to the PCD (i.e., the corresponding reader device 130) with 0° orientation) while the curve 220 corresponds to a second scenario (e.g., an arrangement where the CED (i.e., the communications device 100) is placed in 30 mm distance to the PCD (i.e., the corresponding reader device 130) with 0° orientation). The load modulation amplitude (LMA) that is seen by the corresponding reader device 130 for ALM signals is a function of the TX phase of the communications device 100. Small LMA values cause "blind zones," where the corresponding reader device 130 cannot detect the modulations anymore. The width of these blind zones depends on the sensitivity of the corresponding reader device 130 on the one hand, and on the phase and frequency stability of the ALM signal on the other hand. Because the channel impulse responses for the two communications scenarios are not identical, the same TX phase of the card-emulating device (CED) (i.e., the communications device 100) results in different LMA values seen at the PCD (i.e., the corresponding reader device 130). When the LMA is very low, the PCD (i.e., the corresponding reader device 130) cannot detect the CED modulations and the communications between the card-emulating device (CED) (i.e., the communications device 100) and the proximity coupling device (PCD) (i.e., the corresponding reader device 130) is likely to fail. In the embodiment depicted in FIG. 2, example fail zones 230, 240, 250, 260 for both communications scenarios are indicated by dashed rectangles in FIG. 2. The optimal TX phase of the communications device 100 can be defined as the phase that maximizes the LMA (and hence maximizes the "distance" to fail zones) for a specific communications scenario. The optimal TX phase is shifted 90° with respect to fail zones and, instead of measuring the LMA, it is also possible for the communications device 100 to identify the fail zones by evaluating the communications performance as a function of the TX phase of the communications device 100 to determine optimal TX phase candidates.

Turning back to FIG. 1, the phase optimization module (POM) 104 is configured to perform transmission (TX) phase optimization. The POM 104 may be implemented as at least one processor (e.g., a microcontroller, a digital signal processor (DSP), and/or a central processing unit (CPU)). In some embodiments, training data for the POM 104 includes POM input data and POM target output data. The POM input data, which depends on the specific phase control scheme that is implemented in the POM 104, is representative of a specific communications scenario. Examples of POM input data may include received signal strength indicator (RSSI) values during card mode (CM) reception, analog-to-digital converter (ADC) output signals, and phase-locked loop (PLL) configuration. In some embodiments, the collection of input data streams representing communications scenario i (i is an integer) is represented as a vector $\theta_i$. The POM target output data is the optimal TX phase for the communications scenario i, which can be referred to as $\phi_i^{opt}$. In some embodiments, the POM implements a function $f(\theta_i, a)$ that approximates the mapping $\theta_i \rightarrow \phi_i^{opt}$ based on its parameters a, which means that the POM output can be mathematically defined as $\phi_i = f(\theta_i, a)$. The parameters a can, for example, represent the weights of an artificial neural network (ANN) or the resonance frequency of a linear reference channel model that is used in the POM 104.

In the embodiment depicted in FIG. 1, the POM parameter optimizer 106 is configured to update an arbitrary parameter vector a and to provide the updated parameters to the POM 104. The POM parameter optimizer 106 may be implemented as at least one processor (e.g., a microcontroller, a DSP, and/or a CPU).

In the embodiment depicted in FIG. 1, the control unit 102 is configured to provide training data to the POM parameter optimizer 106 and to provide input vectors to the POM 104. The control unit 102 may be implemented as at least one processor (e.g., a microcontroller, a DSP, and/or a CPU). In some embodiments, a training datapoint for the POM parameter optimizer 106 is defined as:

$$x_i = \{\theta_i, \phi_i^{opt}\}, \tag{1}$$

as a combination of one input vector $\theta_i$ and one corresponding target output phase $\phi_i^{opt}$. A training dataset $\chi$ is the collection of all training datapoints $x_i$. The total number of training datapoints contained in the training dataset can be represented as N, which is a positive integer. One training datapoint $x_i$ represents the desired input-output relationship of the POM 104 for communications scenario i, and may be the result of two measurement steps:

1. Measure $\theta_i$
2. Determine $\phi_i^{opt}$:
   a. Sweep over the TX phase and evaluate communications performance or LMA for each TX phase.
   b. Select the optimal phase $\phi_i^{opt}$ as the TX phase value that maximizes the distance (in °) to fail zones or maximizes LMA.

To build a training dataset $\chi$, the above measurements may be repeated for all N communications scenarios of interest. Once a training dataset $\chi$ is completed, the training dataset $\chi$ is provided to an algorithm that optimizes the function implemented by the POM 104 (i.e., the parameters a) with respect to the training dataset $\chi$. The optimization algorithm may be selected based on the phase control scheme used by the POM 104. In some embodiments, optimization in the context of wrapped quantities, such as, the TX phase, typically means minimizing the mean cyclic error between $\phi_i^{opt}$ and $\phi_i$, but also other cost functions can be implemented. Given that new training datapoints can be acquired during operation in the field, online optimization can be performed based on the new training datapoints.

In some embodiments, for an update of the POM parameters a, a new training datapoint x is required. During operation in the field, the input data $\theta$ of the POM 104 is available to the CED (i.e., the communications device 100) to implement phase control. To define a training datapoint that can be used to update algorithm parameters, the optimal phase $\phi^{opt}$ for the current communications scenario can be acquired for the POM 104. In some embodiments, after a first command (also referred to as the first PCD command), for example, a request (REQ) command or a wakeup (WKUP) command (e.g., a REQA command, a REQB command of International Organization for Standardization/International Electrotechnical Commission (ISO/IEC) 14443 standard, or a SENSEF command of FeliCa standard) is received from the PCD (i.e., the corresponding reader device 130) by the CED (i.e., the communications device 100), a first set of POM inputs $\theta(1)$ is extracted, for example, by the control unit 102, and the CED (i.e., the communications device 100) transmits its response via ALM using the TX phase $\phi(1)$. For example, these commands, which can be used to initiate a transaction, are issued by a PCD device dependent on a specific standard (e.g., ISO/IEC 14443 specifies REQ, WKUP, REQA, REQB commands, whereas a SENSEF command is used in the FeliCa standard in Japan). In case the communications device 100 receives a second command (also referred to as the second PCD command), for example, a second REQ or WKUP command, from the corresponding reader device 130, after the communications device 100 previously replies to the first command, the communications device 100 (e.g., the control unit 102) is informed or determines that its first response is not correctly decoded by the corresponding reader device 130, and it receives new POM input data $\theta(2)$. When the new POM input data $\theta(2)$ is close to the current POM input data $\theta(1)$ (i.e., $\theta(2) \approx \theta(1)$) (e.g., the difference between the new POM input data $\theta(2)$ and the current POM input data $\theta(1)$ is within 5% of the current POM input data $\theta(1)$) the communications device 100 (e.g., the control unit 102) can assume that the communications scenario does not change between the first PCD command and the second PCD command. If the TX phase of the communications device 100 causes the failed communications (i.e., the response to the first PCD command by the communications device 100 is not correctly decoded by the corresponding reader device 130), the TX phase is set to a level such that the resulting LMA level is not strong enough for the corresponding reader device 130 to detect modulations. Consequently, as illustrated in FIG. 2, the LMA maximum and hence the optimal TX phase is shifted 90° with respect to the previously applied TX phase $\phi(1)$ or at least very close to this value. The next CED response can be transmitted by the communications device 100 using an updated TX phase that can be expressed as:

$$\phi(2) = \phi(1) + 90°, \tag{2}$$

where $\phi(1)$ represents the original TX phase, and $\phi(2)$ represents the updated TX phase. When the updated TX phase $\phi(2)$ results in a successful communications between the communications device 100 and the corresponding reader device 130, it is determined, for example, by the control unit 102, that the previously failed communications is TX phase related and that the updated TX phase value $\phi(2)$ can be considered to correspond to $\phi^{opt}$ for the given communications scenario. From the obtained target output $\phi^{opt}$ and the inputs $\theta(1)$, a new training datapoint can be generated and expressed as:

$$x_{N+1} = \{\theta(1), \phi(1) + 90°\}, \tag{3}$$

and the POM parameters a can be re-optimized considering the new training datapoint. Without sweeping over the TX phase, the optimal target phase can be extracted when a previous communications cycle fails, which indicates that LMA is at a minimum value.

In an example operation of the communications device 100 depicted in FIG. 1, after receiving a first PCD command from the corresponding reader device 130, a POM input vector is extracted by the communications device 100. Subsequently, the extracted POM input vector is used by the communications device 100 to determine an initial optimal TX phase value. Subsequently, the TX phase is configured according to the initial optimal TX phase value and the communications device 100 transmits a CED response using the TX phase. If the CED response cannot be decoded by the corresponding reader device 130, the communications device 100 receives a second PCD command from the corresponding reader device 130, which indicates that communications between the communications device 100 and the corresponding reader device 130 fail. Subsequently, the initial optimal TX phase is shifted by 90° to achieve a new optimal TX phase value, using which a second response is sent from the communications device 100 to the corresponding reader device 130. Following a successful communication, the POM 104 can be updated based on a new training data point.

In some embodiments, the communications device 100 (e.g., the control unit 102) shifts the current transmission phase to obtain an updated transmission phase in response to information from the corresponding reader device 130, which indicates that active load modulation (ALM) communications between the communications device 100 and the corresponding reader device 130 using the current transmission phase have failed. The RF modem 108, the matching network 112, and the antenna 114 conduct subsequent ALM communications with the corresponding reader device 130 using the updated transmission phase. In response to the subsequent ALM communications being successfully conducted between the communications device 100 and the corresponding reader device 130 using the updated transmission phase, the communications device 100 (e.g., the control unit 102) obtains a new training data point based on the updated transmission phase. The POM 104 trains an artificial neural network (ANN) in response to the new training data point. In some embodiments, the communications device 100 (e.g., the control unit 102) shifts the current transmission phase by 90° to obtain the updated transmission phase in response to the information from the corresponding reader device 130. In some embodiments, the POM 104 trains an artificial neural network (ANN) in response to the new training data point. In some embodiments, the communications device 100 (e.g., the control unit 102) extracts an input vector for the ANN from a message received from the corresponding reader device 130. The new training data point may include a combination of the input vector and the updated transmission phase. In some embodiments, the communications device 100 (e.g., the POM optimizer 106) updates a weight of the ANN based on the combination of the input vector and the updated transmission phase and the POM 104 trains the ANN.

Figure 3:
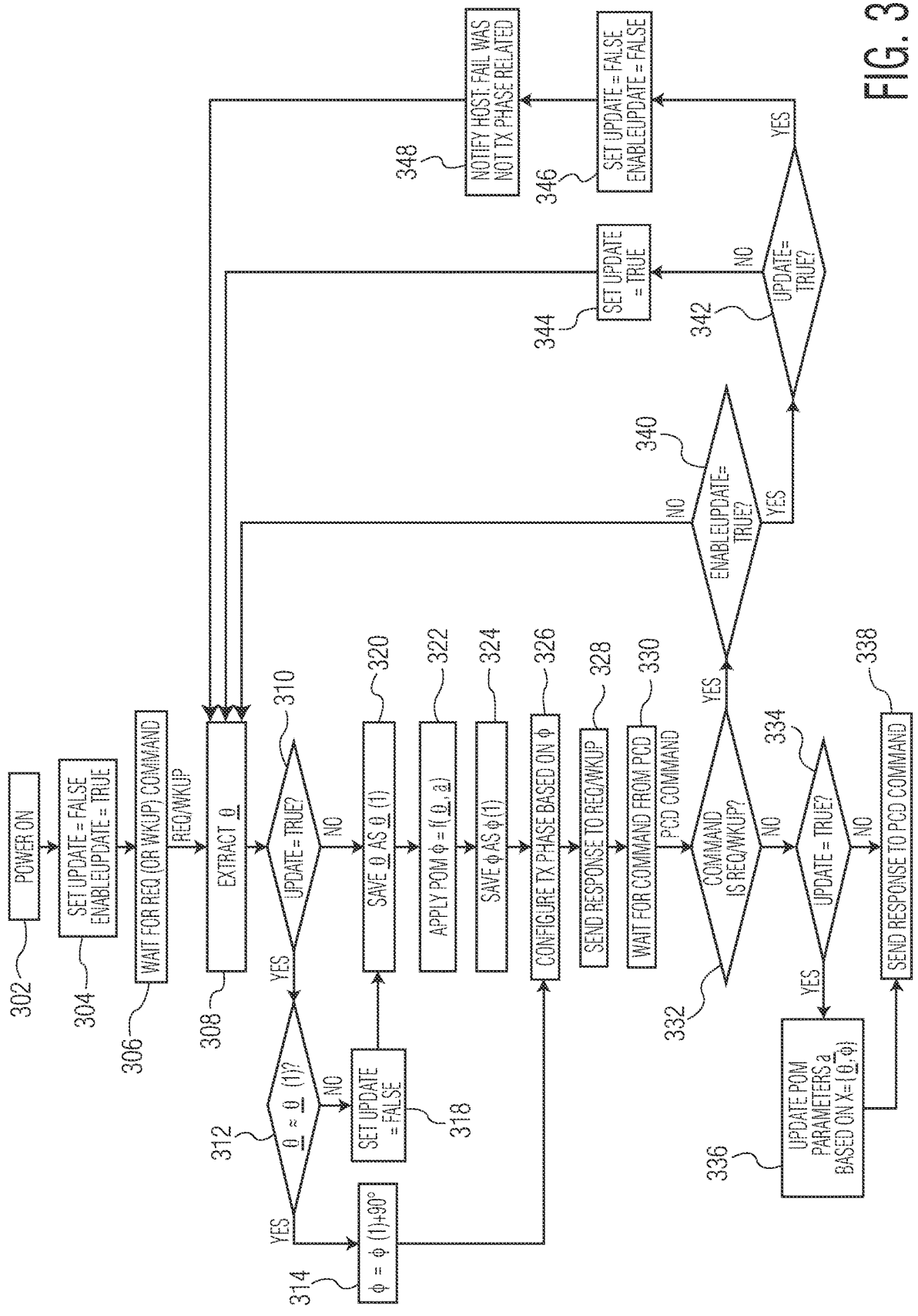
FIG. 3 is a flow chart that illustrates an exemplary operation of the communications device depicted in FIG. 1.

FIG. 3 is a flow chart that illustrates an exemplary operation of the communications device 100 depicted in FIG. 1. In the exemplary operation, a new training data point for the TX phase is obtained for online training from a failed previous communications cycle. At step 302, the communications device 100 is powered on. Typically, the communications device 100 is powered on with RF level detector support in low power mode. For example, when the RF level emitted by a PCD device in proximity is above a threshold, the communications device 100 is powered on. At step 304, "update" and "enableupdate" flags are set for the communications device 100, for example, by the control unit 102. At step 306, the communications device 100 waits to receive a first command from the corresponding reader device 130. At step 308, a POM input vector $\theta$ is extracted by the communications device 100, for example, by the control unit 102.

After the POM input vector $\theta$ is extracted by the communications device 100, it is determined whether or not the update flag is set to true at step 310, for example, by the control unit 102. If the update flag is set to true, it is determined whether or not the current POM input vector $\theta$ is close to the previous POM input vector $\theta(1)$ (e.g., the difference between the current POM input vector $\theta$ and the previous POM input vector $\theta(1)$ is within +5% of the current POM input vector $\theta$) at step 312, for example, by the control unit 102. If the current POM input vector $\theta$ is close to the previous POM input vector $\theta(1)$, the previous TX phase $\phi(1)$ is shifted 90° to obtain a new TX phase value $\phi$ at step 314, for example, by the control unit 102, and the TX phase of the communications device 100 is set accordingly in step 326, for example, at the RF modem 108.

If the current POM input vector $\theta$ is not close to the previous POM input vector $\theta(1)$, the update flag is set to false in step 318 and the current POM input vector $\theta$ is set to identical with the previous POM input vector $\theta(1)$ in step 320, for example, by the control unit 102.

If the update flag is not set to true, the current POM input vector $\theta$ is set to identical with the previous POM input vector $\theta(1)$ in step 320, for example, by the control unit 102. At step 322, the POM function $\phi = f(\theta, a)$ is applied to obtain a new TX phase value $\phi$, for example, by the POM 104, and the current TX phase is set to $\phi$ in step 324.

After the TX phase is configured in step 326, a response is sent from the communications device 100 using the TX phase to the corresponding reader device 130 in step 328. The communications device 100 waits to receive a new command from the corresponding reader device 130 in step 330. It is determined if the received command is a REQ/WKUP command in step 332. If the received command is not a REQ/WKUP command, it is determined whether the update flag is set to true in step 334, for example, by the control unit 102. If the update flag is set to true, the POM parameters are updated based the new training data point in step 336, for example, by the POM optimizer 106, and a response is sent from the communications device 100 to the corresponding reader device 130 using the updated POM parameters in step 338.

If the received command is a REQ/WKUP command, it is determined whether the enableupdate flag is set to true in step 340, for example, by the control unit 102. If false, the process goes back to step 308. If true, it is determined whether the update flag is set to true in step 342, for example, by the control unit 102. If the update flag is not set to true, the update flag is set to true in step 344 and the process goes back to step 308. If the update flag is set to true, the update flag and the enableupdate flag are set to false in step 346, a corresponding host or server is notified that communications failure is not TX related in step 348, and the process goes back to step 308.

Figure 4:
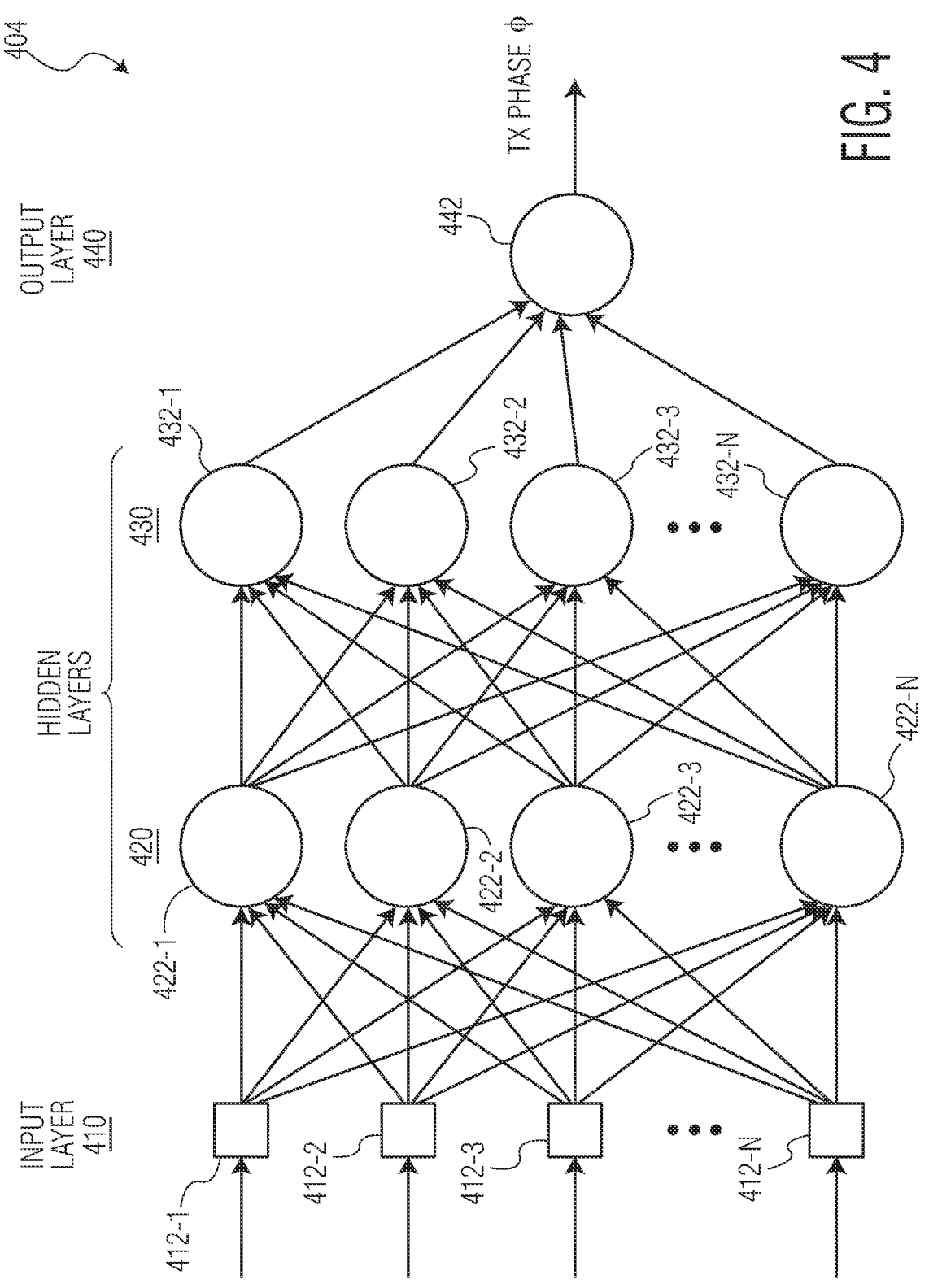
FIG. 4 depicts an embodiment of a phase optimization module (POM) of the communications device depicted in FIG. 1.

In some embodiments, the POM 104 depicted in FIG. 1 is implemented as a neural network. FIG. 4 depicts a POM 404, which is an embodiment of the POM 104 of the communications device 100 depicted in FIG. 1. In the embodiment depicted in FIG. 4, the POM 404 is an artificial neural network (ANN), which includes an input layer 410 with input nodes 412-1, . . . , 412-N (N is a positive integer), two hidden layers 420, 430 with neurons 422-1, . . . , 422-N, and neurons 432-1, . . . , 432-N, respectively, and an output layer 440 with an output node 442. In an example operation of the ANN 404, the ANN receives an input vector θ and generates the TX phase p for the communications device 100, using the output a from the POM optimizer 106 as weights for the ANN 404. Compared to a traditional physical model-based approach that requires data extraction, which needs human expertise to fine tune data features, the ANN may not require human expertise in fine tuning data features and can be implemented with lower costs. When a new training datapoint is acquired, the ANN is updated by re-training with an algorithm (e.g., the Levenberg-Marquardt algorithm or other suitable algorithm) with the current parameters (i.e., the ANN weights) as initialization. The POM 404 depicted in FIG. 4 is one possible embodiment of the POM 104 depicted in FIG. 1. However, the POM 104 depicted in FIG. 1 is not limited to the embodiment shown in FIG. 4.

Figure 5:
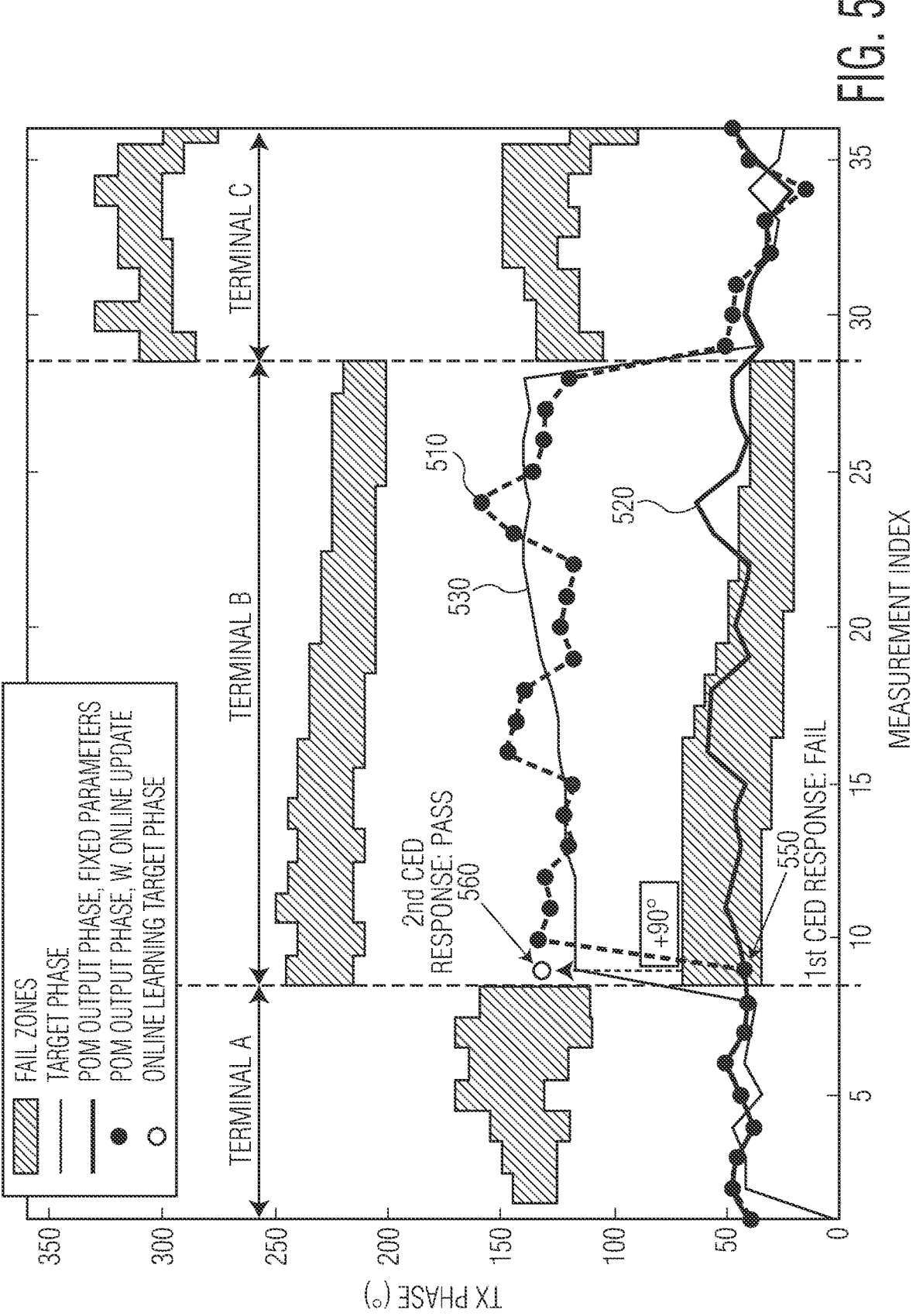
FIG. 5 depicts some examples of POM outputs of the POM depicted in FIG. 4 with three terminals or PCDs.

FIG. 5 depicts some examples of POM outputs of the POM 404 depicted in FIG. 4 with three terminals or PCDs, terminals A, B, and C. Terminals A and C are of the same type of reader terminals. However, the resonance frequencies of terminals A and C are different from each other. Terminal B is a reader terminal that shows different behaviors with respect to the TX phase than terminals A and C. As shown in FIG. 5, POM outputs (i.e., the TX phase of the communications device 100) of the POM 404 (shown in plot 510) are plotted against POM output phase under fixed parameters (shown in plot 520), target TX phase (shown in plot 530). The data includes different communications scenarios such as far-field and near-field measurements. The initial training of the ANN/POM 404 is performed with data associated to terminals A and C only. Test data is selected for all three terminals (neglecting any data used for initial training for terminals A and C). The test data is then presented sequentially to the POM 404, which mimics real-world scenarios, where for example in one public transport station terminal A is present while in another one, the reader terminal B or C is present. Initially, when terminal A is tested, the POM parameters are not updated because all communications cycles pass and both TX phase trajectories coincide. When moving to terminal B, the first response is not successfully received by the PCD (i.e., terminal B) ("1st CED response: fail"). Therefore, for the second CED response, the TX phase is shifted by 90° at point 550, because the corresponding communications succeeded, the POM parameters are updated at point 560. For the next CED response, a TX phase resulting in a detectable LMA at the PCD side is selected. Terminal C is similar to terminal A and both POM variants set the TX phase correctly. However, because the online-updated variant is updated after an initial communications cycle with terminal B, the online-updated variant 510 is slightly different from the fixed parameter POM result plot 520.

FIG. 6 is a process flow diagram of a method for operating a communications device that communicates via inductive coupling in accordance with an embodiment of the invention. At block 602, at the communications device, a first transmission phase is shifted to obtain an updated transmission phase in response to information from a corresponding reader device, which indicates that active load modulation (ALM) communications between the communications device and the corresponding reader device using the first transmission phase have failed. At block 604, at the communications device, subsequent ALM communications are conducted with the corresponding reader device using the updated transmission phase. At block 606, in response to the subsequent ALM communications being successfully conducted between the communications device and the corresponding reader device using the updated transmission phase, a new training data point is obtained based on the updated transmission phase. At block 608, the communications device is trained in response to the new training data point. In some embodiments, at the communications device, the first transmission phase is shifted by 90° to obtain the updated transmission phase in response to the information from the corresponding reader device. In some embodiments, an artificial neural network (ANN) of the communications device is trained in response to the new training data point. In some embodiments, at the communications device, an input vector for the ANN is extracted from a message received from the corresponding reader device. In some embodiments, the new training data point includes a combination of the input vector and the updated transmission phase. In some embodiments, a weight of the ANN is updated based on the combination of the input vector and the updated transmission phase. In some embodiments, the ANN is trained based on the updated weight of the ANN. In some embodiments, at the communications device, an input vector is extracted from a first command from the corresponding reader device. In some embodiments, at the communications device, the first transmission phase is determined based on the input vector. In some embodiments, from the communications device, a first response is transmitted to the first command to the corresponding reader device using the first transmission phase. The communications device may be the same or similar to the communications device 100 depicted in FIG. 1. The corresponding reader device may be the same or similar to the corresponding reader device 130 depicted in FIG. 1.

FIG. 7 is a process flow diagram of a method for operating an NFC device accordance with an embodiment of the invention. At block 702, at the NFC device, a first transmission phase is shifted to obtain an updated transmission phase in response to information from a corresponding NFC reader device, which indicates that ALM communications between the NFC device and the corresponding NFC reader device using the first transmission phase have failed. At block 704, at the NFC device, subsequent ALM communications are conducted with the corresponding NFC reader device using the updated transmission phase. At block 706, in response to the subsequent ALM communications being successfully conducted between the NFC device and the corresponding NFC reader device using the updated transmission phase, a new training data point is obtained based on the updated transmission phase. At block 708, an artificial neural network (ANN) of the NFC device is trained in response to the new training data point. In some embodiments, at the NFC device, the first transmission phase is shifted by 90° to obtain the updated transmission phase in response to the information from the corresponding NFC reader device. In some embodiments, at the NFC device, an input vector for the ANN is extracted from a message received from the corresponding NFC reader device. In some embodiments, the new training data point includes a combination of the input vector and the updated transmission phase. In some embodiments, a weight of the ANN of the NFC is updated based on the combination of the input vector and the updated transmission phase. In some embodiments, the ANN of the NFC device is trained based on the updated weight of the ANN of the NFC. In some embodiments, at the NFC device, an input vector is extracted from a first command from the corresponding reader device. In some embodiments, at the NFC device, the first transmission phase is determined based on the input vector. In some embodiments, from the NFC device, a first response is transmitted to the first command to the corresponding NFC reader device using the first transmission phase. The NFC device may be the same or similar to the communications device 100 depicted in FIG. 1. The corresponding reader device may be the same or similar to the corresponding reader device 130 depicted in FIG. 1.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity. Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for operating a near field communications (NFC) device, the method comprising:
    at the NFC device, shifting a first transmission phase to obtain an updated transmission phase in response to information from a corresponding NFC reader device, which indicates that active load modulation (ALM) communications between the NFC device and the corresponding NFC reader device using the first transmission phase have failed;
    at the NFC device, conducting subsequent ALM communications with the corresponding NFC reader device using the updated transmission phase;
    in response to the subsequent ALM communications being successfully conducted between the NFC device and the corresponding NFC reader using the updated transmission phase, obtaining a new training data point based on the updated transmission phase; and
    training an artificial neural network (ANN) of the NFC device in response to the new training data point.

2. The method of claim 1, wherein at the NFC device, shifting the first transmission phase to obtain the updated transmission phase in response to the information from the corresponding NFC reader device comprises at the NFC device, shifting the first transmission phase by 90° to obtain the updated transmission phase in response to the information from the corresponding NFC reader device.

3. The method of claim 1, further comprising at the NFC device, extracting an input vector for the ANN from a message received from the corresponding NFC reader device.

4. The method of claim 3, wherein the new training data point comprises a combination of the input vector and the updated transmission phase.

5. The method of claim 4, further comprising updating a weight of the ANN of the NFC based on the combination of the input vector and the updated transmission phase.

6. The method of claim 5, wherein training the ANN of the NFC device in response to the new training data point comprises training the ANN of the NFC device based on the updated weight of the ANN of the NFC.

7. The method of claim 1, further comprising at the NFC device, extracting an input vector from a first command from the corresponding NFC reader device.

8. The method of claim 7, further comprising at the NFC device, determining the first transmission phase based on the input vector.

9. The method of claim 8, further comprising from the NFC device, transmitting a first response to the first command to the corresponding NFC reader device under the first transmission phase.

* * * * *